C. & E. G. YOUNG.
ADJUSTABLE SEAT FOR SIDEHILL IMPLEMENTS.
APPLICATION FILED OCT. 19, 1911.
1,039,004.
Patented Sept. 17, 1912.
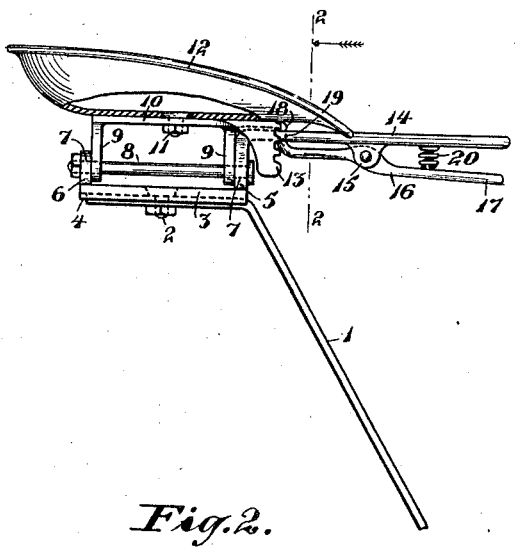
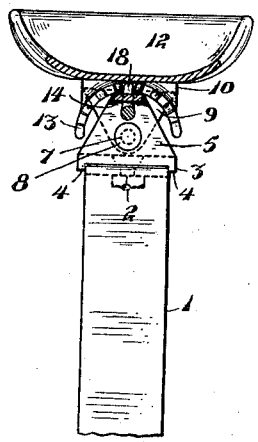
WITNESSES
F. C. Fliedner
N. B. Keating
INVENTORS
Chester Young
Edwin G. Young
BY
Francis M. Wright
ATTORNEY

UNITED STATES PATENT OFFICE.

CHESTER YOUNG AND EDWIN G. YOUNG, OF LIVERMORE, CALIFORNIA.

ADJUSTABLE SEAT FOR SIDEHILL IMPLEMENTS.

1,039,004.  Specification of Letters Patent.  Patented Sept. 17, 1912.

Application filed October 19, 1911. Serial No. 655,481.

*To all whom it may concern:*

Be it known that we, CHESTER YOUNG and EDWIN G. YOUNG, citizens of the United States, residing at Livermore, in the county of Alameda and State of California, have invented new and useful Improvements in Adjustable Seats for Sidehill Implements, of which the following is a specification.

The present invention relates to a seat for agricultural implements used on the sides of hills, the object of the invention being to provide a seat of simple construction which can quickly and easily be adjusted by the rider to a level position to conform to changes in the slope of the hill or when reversing the direction in which the implement is moving.

In the accompanying drawing, Figure 1 is a broken side elevation of our improved seat; Fig. 2 is a sectional view thereof on the line 2—2 of Fig. 1.

Referring to the drawing, 1 indicates a standard the front portion of which is oblique, while the rear portion is horizontal. To said rear portion is secured by a bolt 2 a base 3, having flanges 4 fitting closely against the sides of said rear portion. Formed integral with said base are front and rear upwardly extending plates or supports 5, 6, apertured as shown at 7 to receive a bolt or shaft 8. Upon said shaft are pivoted, close to said supports 5, 6, lugs 9 depending from a seat frame 10, to which is secured, as shown at 11, a seat 12. The seat thus turns upon the shaft 8 as its longitudinal axis. In order to securely retain the seat in any desired angular position about the shaft 8, said seat frame is formed with a forwardly extending crown rack 13, in a plane transverse to said longitudinal axis and formed in an arc of a circle with said axis as center. Formed integral with said support 5 and projecting horizontally and forwardly from the upper portion thereof between said arc and its center is an extension 14, formed with a depending lug 15 to which is pivoted a lever 16, the forwardly extending portion 17 of which forms a handle, by which said lever may be operated, and the rearwardly extending portion 18 of which is bent upward and passed through a hole 19 in the projection and engages one or the other of the notches in the rack. A coiled spring 20 secured to said handle and projection and compressed therebetween normally keeps said dog in its upper position engaging the notch. When the operator wishes to adjust the slope of the seat, either when arriving at a differently sloped part of the hill, or when reversing the direction of the implement on the side of a hill, he first raises the handle upward against the pressure of said spring and thus withdraws the dog from the rack. Then by suitably inclining his body while seated upon the seat, he can move said seat to the proper position, and upon withdrawing the pressure from the handle, the seat is automatically locked in said position.

We claim:—

In combination with a support having upwardly extending apertured plates, one of said plates having a forward extension from its upper portion, of a seat frame having depending lugs formed with apertures registering with the apertures in the plates, a longitudinal bolt through said apertures in said lugs and plates, the seat frame having rigidly connected therewith a rack, the teeth of which are above said bolt and lie in a plane transverse thereto, and in an arc of a circle about the axis of said bolt as center, a lever pivoted upon said extension, and formed at one end with a dog engaging said rack, and a spring between said extension and lever.

In testimony whereof we have hereunto set our hands in the presence of two subscribing witnesses.

CHESTER YOUNG.
EDWIN G. YOUNG.

Witnesses:
M. G. CALLAGHAN,
A. L. HENRY.